United States Patent
Virostek et al.

(10) Patent No.: US 10,445,636 B2
(45) Date of Patent: Oct. 15, 2019

(54) INTERFERENCE-OPTIMISED METAL DATA CARRIER

(71) Applicant: Giesecke+Devrient Mobile Security GmbH, München (DE)

(72) Inventors: Eric Virostek, Silver Lake, OH (US); Thomas Tarantino, Laufen (DE); Nick Pisarev, Ashburn, VA (US); Stefan Kluge, München (DE)

(73) Assignee: Giesecke+Devrient Mobile Security GmbH, München (DE)

( * ) Notice: Subject to any disclaimer, the term of this patent is extended or adjusted under 35 U.S.C. 154(b) by 0 days.

(21) Appl. No.: 16/023,070

(22) Filed: Jun. 29, 2018

(65) Prior Publication Data

US 2019/0005372 A1    Jan. 3, 2019

Related U.S. Application Data

(60) Provisional application No. 62/528,220, filed on Jul. 3, 2017.

(51) Int. Cl.
*G06K 19/077* (2006.01)

(52) U.S. Cl.
CPC . *G06K 19/07773* (2013.01); *G06K 19/07722* (2013.01); *G06K 19/07771* (2013.01)

(58) Field of Classification Search
CPC ........ G06K 19/00; G06K 19/04; G06K 19/06; G06K 19/07; G06K 19/067
USPC ................. 235/492, 380, 487, 375
See application file for complete search history.

(56) References Cited

U.S. PATENT DOCUMENTS

| | | | |
|---|---|---|---|
| 9,390,366 B1 | 7/2016 | Herslow et al. | |
| 9,943,228 B2 | 4/2018 | Kappel et al. | |
| 2006/0017571 A1* | 1/2006 | Arnold | G06K 19/07749 340/572.7 |
| 2008/0191029 A1* | 8/2008 | Deloche | G06K 19/07749 235/492 |
| 2009/0085819 A1* | 4/2009 | Watanabe | H01Q 1/521 343/787 |
| 2014/0353384 A1* | 12/2014 | Hoegerl | G06K 19/07707 235/488 |
| 2016/0135684 A1 | 5/2016 | Kappel et al. | |
| 2017/0017871 A1* | 1/2017 | Finn | G06K 19/07722 |

FOREIGN PATENT DOCUMENTS

| | | |
|---|---|---|
| DE | 10148563 A1 | 4/2003 |
| DE | 102008005795 A1 | 7/2009 |
| DE | 102010005809 A1 | 7/2011 |
| DE | 102011017168 A1 | 10/2012 |
| DE | 102014116537 A1 | 5/2016 |

OTHER PUBLICATIONS

International Search Report from PCT Application No. PCT/EP2018/000333, dated Sep. 14, 2018.

* cited by examiner

*Primary Examiner* — Edwyn Labaze
(74) *Attorney, Agent, or Firm* — Workman Nydegger

(57) ABSTRACT

A layer arrangement is provided for manufacturing an interference-optimized, metal and card-shaped data carrier and to a layer laminate comprising the layer arrangement.

15 Claims, 5 Drawing Sheets

INTERFERENCE-OPTIMISED METAL DATA CARRIER

FIELD OF THE DISCLOSURE

The present invention relates to a layer arrangement for manufacturing an interference-optimised, metal and card-shaped data carrier and to a layer laminate comprising the layer arrangement.

BACKGROUND

Further, a device for manufacturing the data carrier and an analogous method are proposed, which are also suitable for manufacturing the claimed layer arrangement. Further, the present invention relates to a computer program product comprising control commands which implement the method proposed herein or operate the device proposed herein.

DE 10 2014 116 537 A1 discloses a functional skin plaster which comprises a first surface and a second surface as well as a metal layer, a ferrite layer and an antenna layer. However, in this context it is disadvantageous that the antenna layer is arranged for example on the surface of the plaster, meaning that it is not protected. Further, a skin plaster which is subject to different requirements is also proposed, such as a chip card, since a skin plaster always has to be read out from only one side once it is attached to human skin.

U.S. Pat. No. 9,390,366 B1 discloses a smart card comprising a layer construction which provides that an antenna arrangement is introduced into a metal layer. Thus, these are not separate layers, and in particular the antenna is substantially integrated into a layer on the surface of the shown layer arrangement. A flat antenna layer, which would be arranged between a metal layer and a ferrite layer, is not shown.

In the prior art, different layer arrangements are known which relate for example to smart cards or skin plasters. However, in this context problems may result from the fact that, during wireless communication using an antenna, interference occurs in that metal elements or layers within the layer arrangement act on radiation in such a way that a signal is distorted or can no longer even be recognised. On the other hand, the customer often wishes to incorporate metal layers into corresponding models. This can be advantageous because the metal layer stabilises the card body as a whole or simply creates an aesthetic optical effect. In addition, metal surfaces or at least metal layers in card-shaped data carriers are found to be particularly stylish and provide a particular haptic experience.

Generally, smart cards are known which comprise among others a micro controller, a memory and further components. These further components include induction coils, which can act as an antenna in such a way that a current is induced in said antenna and is used to supply current to the corresponding electronic components. However, in contactless chip cards of this type, it is disadvantageous that a metal layer can potentially have a negative effect on the functionality of the antenna.

To overcome this problem, various layer arrangements are known, it having been proposed for example to integrate the antenna into a shielding layer in such a way that the antenna is exposed towards the surface of the card body and the shielding layer merely laterally encloses the antenna arrangement. This does reduce the interfering effect of the metal, but the result is not sufficiently satisfactory for interference-free communication to be possible. If the antenna unit is integrated into the metal layer, interference still occurs, in such a way that a negative effect on the antenna is to be expected.

A further, independent problem is that for example chip cards which comprise a metal layer cannot be processed by conventional production machines, since the antenna has to be appropriately integrated into the metal layer. By contrast, it is known to provide the individual layers and to arrange electronic components between them which are subsequently laminated together to form a card body. However, if there are no separate layers in this context, standard production methods cannot be used, in particular in combination with a dual interface. Thus, a problem with conventional methods is that smart cards which comprise metal layers and which also provide RFID functionality can only be manufactured in a complex manner.

SUMMARY

Thus, an object of the present invention is to provide a layer arrangement or a layer laminate by means of which a chip card can be formed, in which a radio technology of low technical complexity is to be implemented using metal layers. The present invention further relates to a corresponding method or device for manufacturing the layer arrangement and to a computer program product comprising control commands which implement the proposed method or operate the proposed device.

Accordingly, a layer arrangement for manufacturing an interference-optimised, metal and card-shaped data carrier is proposed, comprising a metal layer for stabilising a card body, a screening layer for reducing interference which results from interaction between the metal layer and the operation of an antenna, an antenna layer for receiving the antenna, the shielding layer being arranged between the metal layer and the antenna layer. The layer arrangement can be used for manufacturing the data carrier, but the layer arrangement may also form the data carrier or the card body thereof by itself. A card-shaped data carrier is preferably a chip card, it also being possible to provide the shape of a card by using a format of an ID card. In particular, in this way a passport booklet page which bears features of an ID card can thus also be provided. The data carrier can thus also be introduced into other documents. However, in this context the preferred embodiment is a smart card or chip card.

The proposed layer arrangement is interference-optimised in particular because the arrangement according to the invention provides that the metal layer is particularly advantageously separated from the antenna layer in such a way that, during induction by the antenna, little or no interference occurs in such a way that the metal layer reflects corresponding radiation or unfavourably distorts induced currents. An antenna is typically a conductive coil which can be pressed or etched or a wire which according to the invention is shielded from the metal layer by the shielding layer. In particular, this also applies to the antenna layer which is set up to receive the antenna.

The metal layer can be used for stabilising the card body, but this should not be considered limiting in the present context. Thus, the metal layer can also be introduced into the data carrier as a result of purely optical or haptic considerations. Thus, there are corresponding customer wishes which provide a metal layer which still has to be coupled by means of a wireless or contactless interface unit. In this context, complicated arrangements have been proposed which involve high technical complexity. According to the invention, it is possible to reduce the interference by means of a shielding layer in such a way that the metal layer does not have a negative effect on the operation of the antenna. For this purpose, interference, in other words any influence of the metal layer on the operation or functionality of the antenna, is prevented. In this context, a person skilled in the art will recognise that prevention is typically not completely possible, and so interference is at least reduced or substantially prevented.

The shielding layer may for example comprise ferrite, for example ferrite particles in a polymer carrier matrix, or be manufactured entirely from ferrite. This layer may for example be attached to the metal layer using an adhesive layer and/or the adhesive layer may be part of the ferrite layer. The shielding layer may be referred to as a reflector or a shield, which delimits the metal layer from the antenna layer or antenna in such a way that shielding is provided between the metal layer and the antenna layer or antenna.

The operation of an antenna may generally be understood to mean transmitting and receiving signals, the antenna typically being configured as a coil, preferably an induction coil. In this context, the antenna is held on a corresponding reading device, whereupon the antenna is excited in such a way that a current is induced therein. This current is for operating the electronic components of the data carrier. When data are transmitted, the antenna is also excited, and a reading device to which the data carrier is held up receives corresponding signals from the antenna. A shielding layer is provided in such a way that the metal layer does not have any negative effects on the reception or transmission of the antenna.

The antenna layer is for receiving the antenna, it being possible for the antenna to be for example etched, pressed or simply introduced into the antenna layer. Thus, a person skilled in the art already knows various technologies by means of which to create an antenna. An antenna may for example be in the form of a wire, preferably a copper wire, which is attached to the antenna layer and for example glued or laminated thereto. In this context, a person skilled in the art knows various configurations of an antenna layer of this type which acts as a carried layer for receiving the antenna. Thus, the antenna layer may also be referred to as a carrier layer in the context of the present invention.

The shielding layer is arranged between the metal layer and the antenna layer, meaning that complex arrangements such as are disclosed in the art are prevented. In particular, it is thus no longer necessary to integrate electronic or electrical components into a layer, but instead a simple layer arrangement is created which merely provides that the shielding layer is arranged between the metal layer and the antenna layer. Thus, it is also particularly advantageous that the proposed layer arrangement can be laminated together in a simple manner using known methods and devices. In this context, a person skilled in the art will recognise that he can use further simple methods, such as gluing or else coextruding, if this is possible for the materials used. In this context, it is particularly advantageous that conventional methods for connecting the layers can be used and the layers can also be configured flat and simply hot-pressed.

In one aspect of the present invention, the shielding layer and the antenna layer are configured as separate layers. This has the advantage that the antenna need not be integrated into an existing shielding layer in a complex manner or the antenna has to be integrated into a further layer such as the metal layer. In this context it is particularly advantageous for the antenna layer also to be configured flat and thus for the shielding layer and the antenna layer to be easily connectable in such a way that the shielding layer covers the antenna layer in a flat manner or the shielding layer covers the metal layer in a flat manner, in such a way that interference is reduced.

In a further aspect of the present invention, the shielding layer is arranged in a flat manner with respect to the antenna layer. This has the advantage that particularly favourable shielding takes place in such a way that the antenna layer is covered as completely as possible by the shielding layer and interference can thus be prevented or reduced. Further, this arrangement is particularly advantageous because conventional methods for connecting layers can be used, for example hot lamination. Thus, according to the invention it is made possible for the layer arrangement to be connectable at a low technical complexity, in other words with few adaptations to conventional production machines. Since in conventional production machines layers are always arranged and connected, it now merely remains to ensure that the shielding layer is arranged between the metal layer and the antenna layer.

In a further aspect of the present invention, the shielding layer is in the form of a coating of the metal layer. This has the advantage that the metal layer and the shielding layer can be manufactured in one work step, and in particular that the shielding layer can be manufactured at low technical complexity. In this way, the shielding layer and the metal layer thus form a single, integral layer which can be connected to other layers in further method steps.

In a further aspect of the present invention, the shielding layer is arranged directly on the metal layer. This has the advantage that no further intermediate layers or intermediate components are arranged between the metal layer and the shielding layer, in such a way that interference can likewise be reduced. Thus, according to the invention it is also possible for the shielding layer not necessarily to be provided as a separate layer, and instead a person skilled in the art knows further methods by which he can connect the shielding layer to or coat it with the metal layer directly. Optionally, in this context it is also possible for further layers to be providable, for example an adhesive layer which glues the shielding layer to the metal layer. However, the embodiment of coating the metal shield using the shielding layer is preferred, for example by spraying, for example powder coating or wet coating or another type, or by printing, for example screen printing or another suitable printing method.

In a further aspect of the present invention, the shielding layer is in the form of a ferrite layer. This has the advantage that the shielding properties for reducing interference can also be used in the present case, and in particular that a tried and tested material is used, in such a way that the reduction of interference can be optimised.

In a further aspect of the present invention, further layers are introduced between the shielding layer and the antenna layer. This has the advantage that for example a layer can be introduced which forms a decorative film or a layer into which further optical features are introduced. For this purpose, it is possible for example to configure the antenna layer in such a way that it is transparent at least in part or is semi-transparent. In particular, the antenna layer may be configured to be translucent or to be translucent at least in part.

In a further aspect of the present invention, a dual-interface module is provided, which is electrically coupled to the antenna. This has the advantage that the metal layer does not have any negative effects even for a contactless or air interface, and that it is thus also possible to provide metal cards which actually have a contactless interface. In the context of the invention, interfaces which can be read out both contactlessly and by contact are referred to as dual interfaces. In this way, according to the invention it is thus ensured that a chip card can be provided which can be read out both by induction coil and by establishing conductive contact.

In a further aspect of the present invention, a protective layer is directly connected to the antenna layer in such a way that the protective layer forms an external layer of the layer arrangement. In this context, a person skilled in the art will recognise that the protective layer is preferably to be attached to the side of the antenna layer on which neither the shielding layer nor the metal layer is located. This has the advantage that the antenna layer is protected but can still be operated in combination with a metal layer. The protective layer may for example be a transparent overlay.

In a further aspect of the present invention, the dual-interface module is electrically or electromagnetically coupled to the antenna via an anisotropic conductive layer (ACF or ACP). This has the advantage that a compact layer construction can be brought about and in addition an anisotropic conductive film (ACF) or an anisotropic conductive paste (ACP) can be used.

In a further aspect of the present invention, further electronic components are provided within the layer arrangement. This has the advantage that typical chip card components, such as an electric circuit or a micro controller along with corresponding memory units, can be integrated into the layer arrangement. Further, it is also possible according to the invention to integrate an energy store, which supplies the electronic components with current, into the layer arrangement.

Generally, the layer arrangement is suitable for manufacturing a data carrier, in particular a data carrier in the form of a chip card or a passport booklet page, a layer laminate also being proposed. It is thus possible to provide the layer arrangement by means of a layer laminate which can also be connected to further layers in further steps. All in all, the layer arrangement thus merely provides part of a card body, which may optionally comprise further layers.

The object is thus also achieved by a layer laminate comprising the proposed layer arrangement.

The object is also achieved by a device for providing a layer arrangement for manufacturing an interference-optimised, metal and card-shaped data carrier, comprising a first means set up to provide a metal layer for stabilising a card body, a second means set up to provide a shielding layer for reducing interference which results from interaction between the metal layer and the operation of an antenna, and a third means set up to provide an antenna layer for receiving the antenna, the device being set up to arrange the shielding layer between the metal layer and the antenna layer. In this context, a person skilled in the art will recognise that the individual means for providing may also be provided as a single means, or else that separate means are also being proposed. In particular, it is possible for further means not discussed herein to be provided.

The object is also achieved by a method for providing a layer arrangement for manufacturing an interference-optimised, metal and card-shaped data carrier which is configured analogously to the device.

The object is also achieved by a computer program comprising control commands which implement the proposed method or operate the proposed device.

According to the invention, it is particularly advantageous for the layer arrangement to comprise structural features which are created by the proposed device and additionally can be created by the proposed method. Thus, the method comprises method steps which create the structural features of the layer arrangement. Further, the method is suitable for operating the device and the device is suitable for carrying out the corresponding method.

BRIEF DESCRIPTION OF THE DRAWINGS

Further advantageous embodiments are described in greater detail with reference to the accompanying drawings, in which.

DETAILED DESCRIPTION OF VARIOUS EMBODIMENTS

Figure 1:
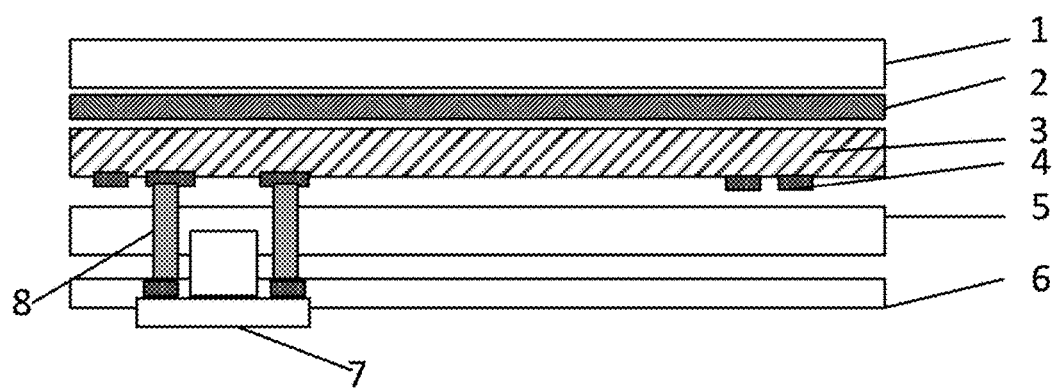
FIG. 1 shows a layer arrangement for manufacturing a data carrier in accordance with an aspect of the present invention.

FIG. 1 shows the layer construction according to the invention, a metal layer 1, shown at the top in the present case, being arranged on the front face and being followed by a ferrite layer 2. This is followed by a layer 3 comprising an antenna 4. The antenna 4 is for example etched, pressed or wired or introduced by another known technology. The layer 5 may for example form a decorative layer, which is printed. This is followed by a transparent overlay layer 6, which ends the card or the layer arrangement. On the rear face, shown at the bottom in the present case, a dual-interface module 7 is integrated, for example by adhesive connection. For the electrical connection 8 between the module 7 and the antenna 4, silver paste for example, which is used in soldering and potentially also in laser welding, point welding etc., or generally an electrically conductive material may be provided.

Figure 2:
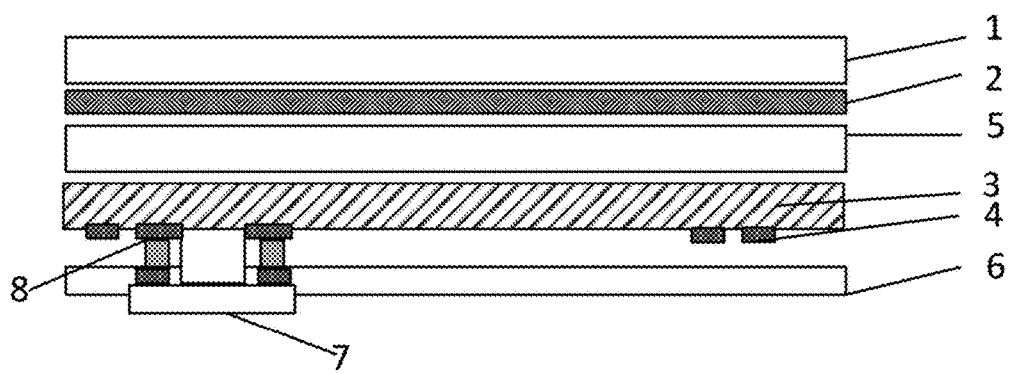
FIG. 2 shows a layer arrangement for manufacturing a data carrier in accordance with a further aspect of the present invention.

FIG. 2 shows a further layer arrangement, the antenna layer 3 being arranged closer to the rear face of the car body, for example by using a thinner film layer 5 or by not including one. The advantage of a construction of this type is that an anisotropic conductive film (ACF) or anisotropic conductive paste (ACP) can be used for the electrical connection 8.

Figure 3:
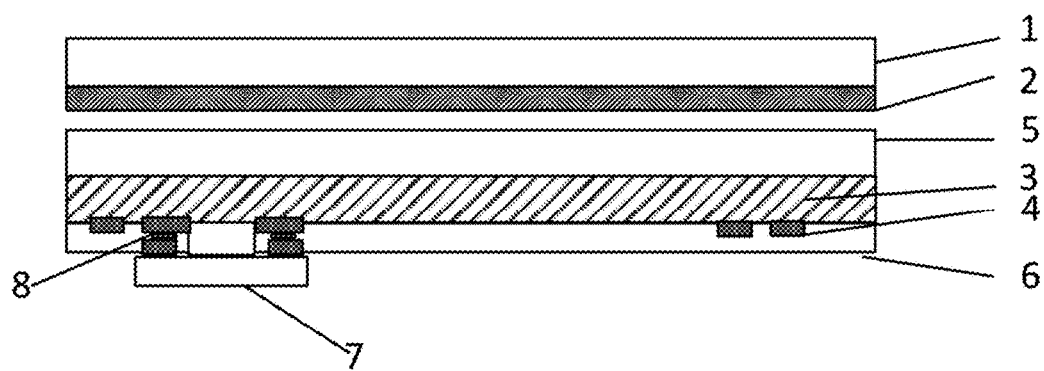
FIG. 3 shows a layer arrangement for manufacturing a data carrier in accordance with a further aspect of the present invention.

FIG. 3 shows that the ferrite material 2 can be attached directly to the metal layer 1. This may take place by screen printing, slot die or other printing methods, evaporation, spraying, sintering or coating. In separate production steps, the layers 3, 5 and 6 may for example be laminated together. In a final production step, the separate layers can be interconnected. This can take place by bonding. The bonding may be carried out at a low temperature in such a way that it does not have a negative effect on the functionality of the ferrite material.

Figure 4:
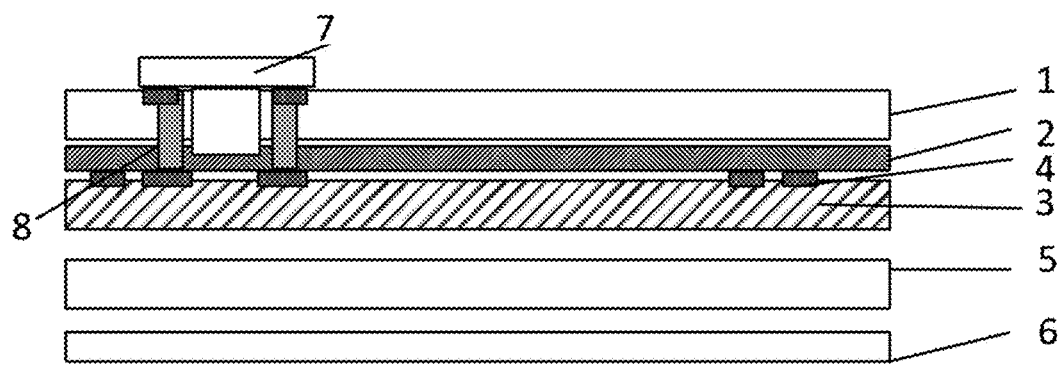
FIG. 4 shows a layer arrangement for manufacturing a data carrier in accordance with a further aspect of the present invention.

FIG. 4 shows a further layer arrangement, the dual-interface unit 7 being arranged on the front face of the card.

In the present drawings, all layers may also be referred to as films, and they may vary in the respective thicknesses thereof. It is further possible to configure individual layers to be transparent or opaque and to provide further layers or to configure the proposed layers as a plurality of separate sub-layers. It is further possible not to arrange the metal layer 1 externally, and instead a protective layer, for example a plastics material such as PVC, may be provided.

According to the invention, it is possible that a layer preferably consisting of ferrite can be arranged between the metal layer and the antenna layer, redirecting the RFID field lines in such a way that they point in a direction such that the RFID functionality of the dual-interface chip is provided.

Figure 5:
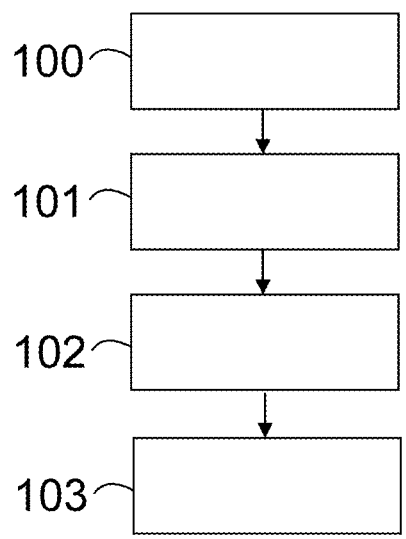
FIG. 5 is a schematic flow chart of a method for manufacturing the layer arrangement in accordance with an aspect of the present invention.

FIG. 5 is a schematic flow chart of a method for providing a layer arrangement for manufacturing an interference-optimised, metal and card-shaped data carrier, comprising providing 100 a metal layer 1 for stabilising a card body, providing 101 a shielding layer 2 for reducing interference which results from interaction between the metal layer 1 and the operation of an antenna 4, and providing 102 an antenna layer for receiving the antenna 4, the shielding layer 2 being arranged 103 between the metal layer 1 and the antenna layer 3.

In this context, a person skilled in the art will recognise that the individual method steps can be carried out iteratively or in a different order. In particular, it is possible to configure the method steps of providing in a different order. Further method steps may further be required, or further layers may be provided, or else the layers shown may also be provided as multi-layers.

The invention claimed is:

1. A layer arrangement for manufacturing an interference-optimised, metal and card-shaped data carrier, comprising:
   a metal layer for stabilizing a card body;
   a shielding layer for reducing interference which results from interaction between the metal layer and the operation of an antenna; and
   an antenna layer for receiving the antenna, wherein the shielding layer is arranged between the metal layer and the antenna layer, and
   wherein the shielding layer completely covers the metal layer on a first side.

2. The layer arrangement according to claim 1, wherein the shielding layer and the antenna layer are configured as separate layers.

3. The layer arrangement according to claim 1, wherein the shielding layer is arranged flat with respect to the antenna layer.

4. The layer arrangement according to claim 1, wherein the shielding layer is in the form of a coating of the metal layer.

5. The layer arrangement according to claim 1, wherein the shielding layer is arranged directly on the metal layer.

6. The layer arrangement according to claim 1, wherein the shielding layer is in the form of a ferrite layer.

7. The layer arrangement according to claim 1, wherein further layers are introduced between the shielding layer and the antenna layer.

8. The layer arrangement according to claim 1, wherein a dual-interface module is provided which is electrically or electromagnetically coupled to the antenna.

9. The layer arrangement according to claim 8, wherein the dual-interface module is electrically coupled to the antenna via an anisotropic conductive layer.

10. The layer arrangement according to claim 1, wherein a protective layer is directly connected to the antenna layer in such a way that the protective layer forms an external layer of the layer arrangement.

11. The layer arrangement according to claim 1, wherein further electronic components are provided within the layer arrangement.

12. The layer laminate comprising a layer arrangement according to claim 1.

13. A device for providing a layer arrangement for manufacturing an interference-optimised, metal and card-shaped data carrier, comprising:
   a first means set up to provide a metal layer for stabilising a card body;
   a second means set up to provide a shielding layer for reducing interference which results from interaction between the metal layer and the operation of an antenna; and
   a third means set up to provide an antenna layer for receiving the antenna, wherein the device is set up to arrange the shielding layer between the metal layer and the antenna layer, and
   wherein the shielding layer completely covers the metal layer on a first side.

14. A method for providing a layer arrangement for manufacturing an interference-optimised, metal and card-shaped data carrier, comprising:
   providing a metal layer for stabilising a card body;
   providing a shielding layer for reducing interference which results from interaction between the metal layer and the operation of an antenna; and
   providing an antenna layer for receiving the antenna, wherein the shielding layer is arranged between the metal layer and the antenna layer, and
   wherein the shielding layer completely covers the metal layer on a first side.

15. A computer program product comprising control commands which carry out the method according to claim 14 when implemented on a computer.

* * * * *